United States Patent [19]

Constantine et al.

[11] 4,416,225
[45] Nov. 22, 1983

[54] IMPROVEMENTS RELATING TO INTERNAL COMBUSTION ENGINES

[75] Inventors: Albert B. Constantine, 2 Tintagal, Great Lumley, Chester-le-St. Co. Durham DH3 4NE, England; Alan D. Walker, Yatton, England

[73] Assignees: Albert Constantine; Cadbury Schweppes Transport Services Ltd., both of Birmingham, England

[21] Appl. No.: 291,097

[22] Filed: Aug. 7, 1981

[51] Int. Cl.³ .......................................... F02M 25/02
[52] U.S. Cl. .............................. 123/25 E; 123/25 C
[58] Field of Search ............... 123/25 R, 25 A, 25 E, 123/25 L, 25 C, 510, 514

[56] References Cited

U.S. PATENT DOCUMENTS

| | | | |
|---|---|---|---|
| 2,319,858 | 5/1943 | Grow | 123/25 E |
| 3,107,657 | 10/1963 | Cook | 123/25 R |
| 3,606,868 | 9/1971 | Voogd | 123/25 R |
| 3,818,876 | 6/1974 | Voogd | 123/25 R |
| 4,273,078 | 6/1981 | Cottell | 123/25 R |

*Primary Examiner*—Ira S. Lazarus
*Attorney, Agent, or Firm*—Fred Philpitt

[57] ABSTRACT

The invention provides an internal combustion engine, such as a diesel engine, set to run on an emulsion of fuel and water, supplied to an emulsifier through separate fuel and water lines. The water feed preferably is under gravity, and the water line has a metering orifice to control the flow of water. If the engine is provided with emulsion overspill, this is returned through a return line for the overspilled emulsion, and said return line has a surge tank with a vent enabling the venting of air and/or the breaking of vacuum in the return line.

7 Claims, 6 Drawing Figures

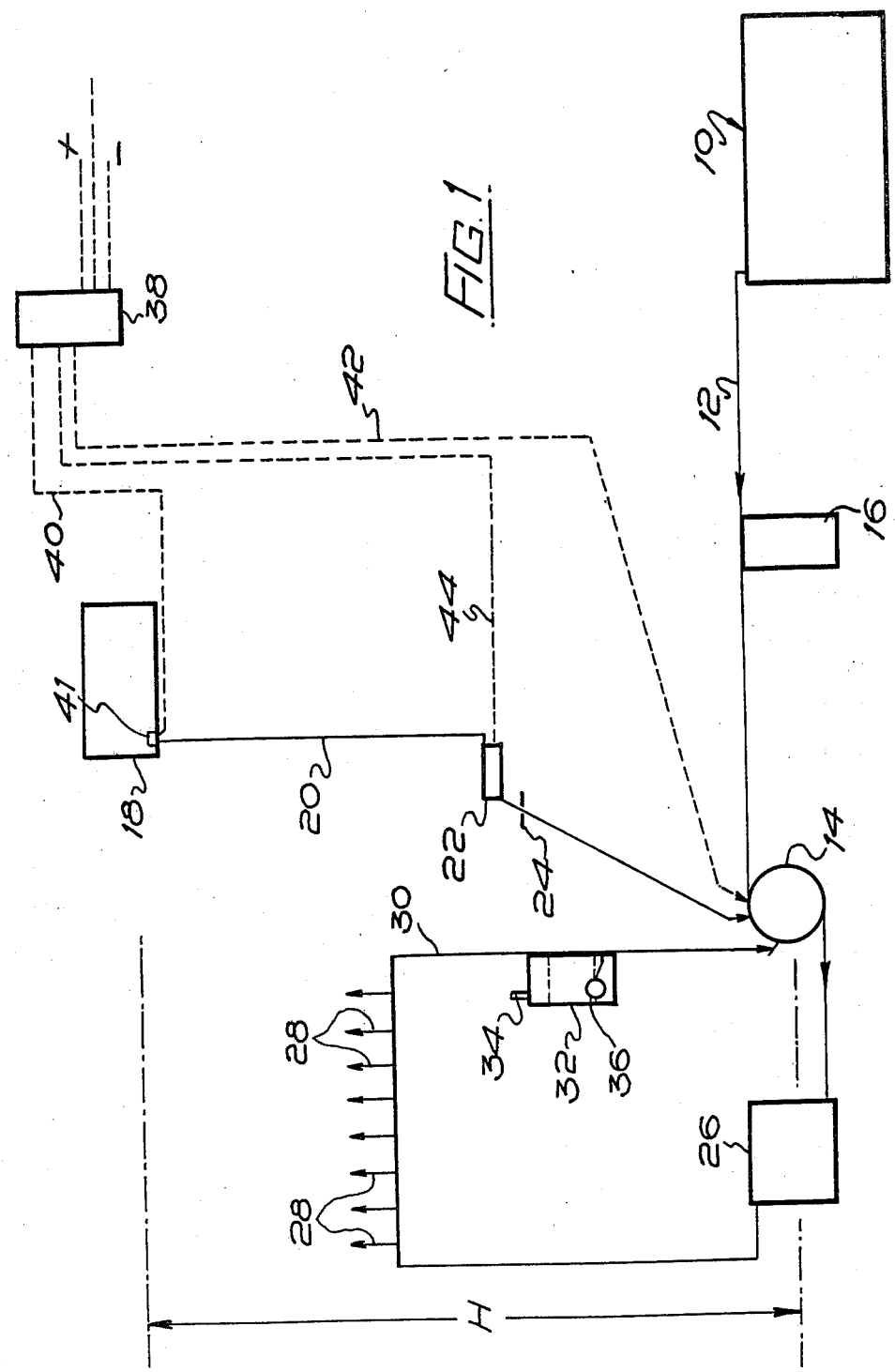

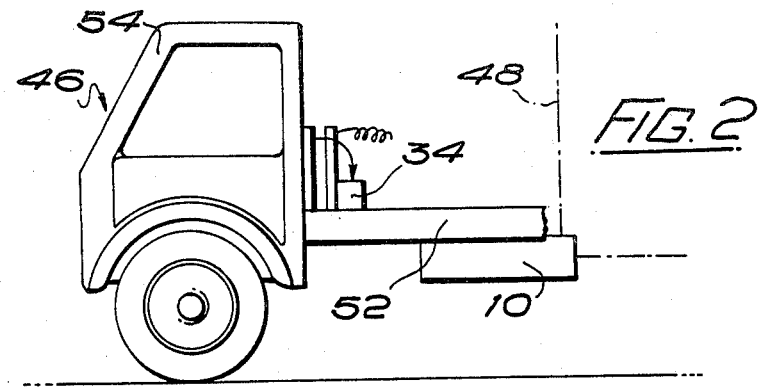
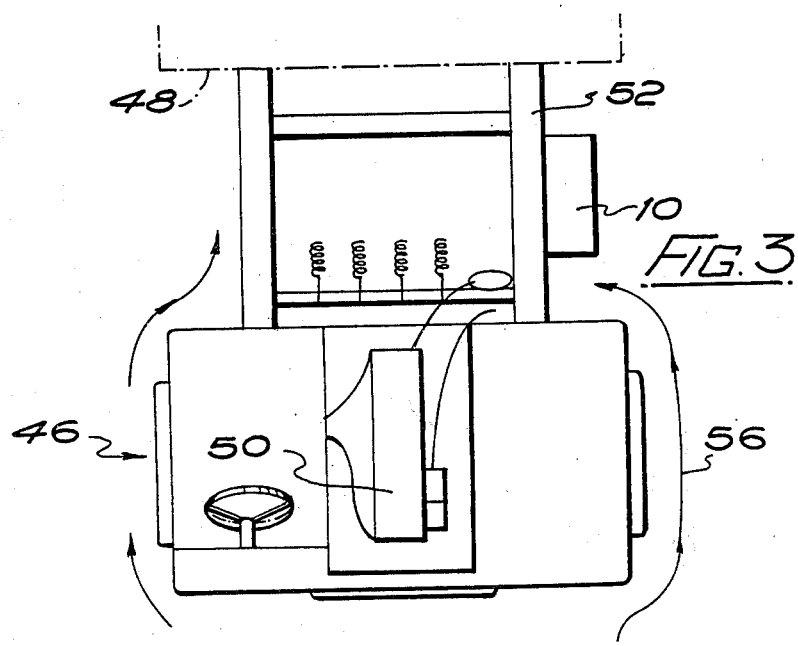
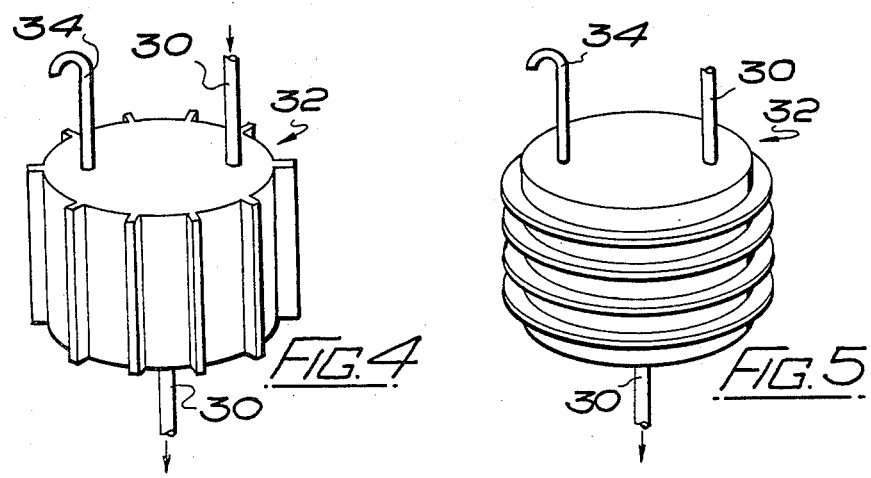

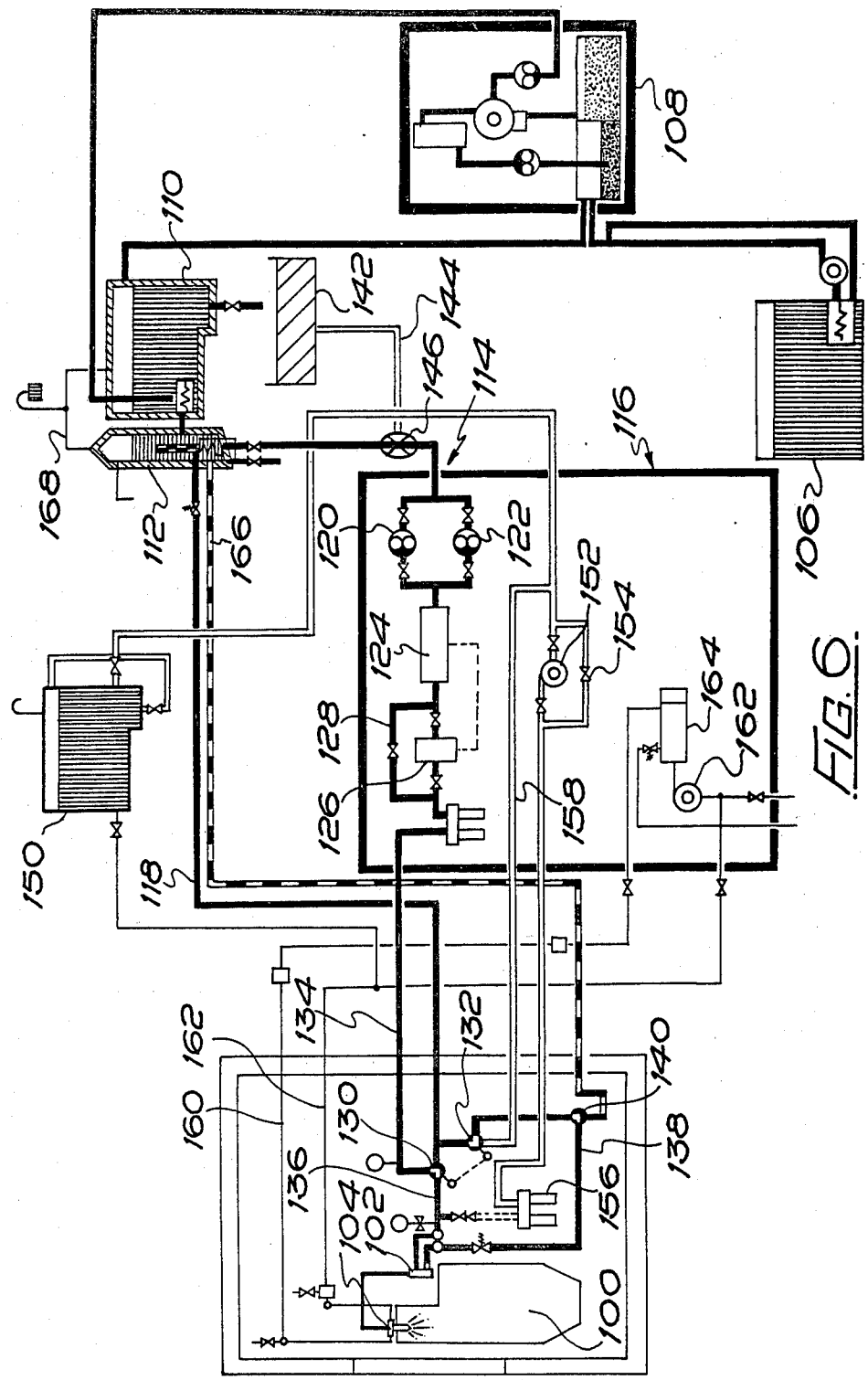

IMPROVEMENTS RELATING TO INTERNAL COMBUSTION ENGINES

This invention relates to internal combustion engines which have a fuel supply system set up to supply the engine with an emulsion of fuel and water, and generally speaking the invention can be applied to all forms of internal combustion engines. Typically, internal combustion engines may be automotive engines for propelling mobile road, rail and industrial vehicles, marine engines for propelling marine vessels and engines for static applications such as are used in industry for driving electricity generators, pumps, compressors and the like. The internal combustion engines are generally of a rating of up to 500 H.P. for road vehicle engines, 2,500–3,000 H.P. for rail vehicle engines and marine engines, whilst static industrial engines may have a rating as high as 60,000 H.P. or greater, and therefore it can be seen that the invention has wide application. Generally speaking the smaller the engine the lighter or less viscous the fuel which is used, and the larger the engine the heavier or more viscous the fuel which is used. The invention provides two aspects concerning the fuel and water emulsion supply system. One aspect relates only to internal combustion engines having fuel overspill (or recirculation), be this a trickle overspill such as 1 to 2% and up to 10% or a high overspill, as much as of the order of 70%. Overspill engines are usually diesel engines having fuel injectors and overspill is used on the one hand to ensure that the injector pumps stay full and to ensure that air or other gas drawn into the injector is vented and in the case of higher viscosity fuels, ensures that the correct operational temperature of the fuel can be maintained. A high overspill in certain cases is additionally used for cooling of the injectors, although in marine and some other engines the injectors are cooled by separate means. The overspill is returned to the fuel tank which provides the vent but this is not possible when an emulsion is being used.

The second aspect of the invention relates to any type of internal combustion engine, petrol or diesel, as it relates to the manner of feeding the water to the fuel supply system.

It is of course well known to emulsify diesel fuel and water, to produce an emulsion which is supplied to the engine, the main purposes behind the utilisation of water being to economise in the fuel, to limit pollution of the atmosphere and for the cleaner running of the engine.

Because water, a non-combustible liquid, is being introduced into the engine, care must be taken to ensure that the supply of the emulsion is kept under control, and in fact we have been working in this field on the basis of the disclosure of the invention in British Pat. No. 1,596,496, the proposal of which is that the ratio of water to fuel in the emulsion should be controlled such that with increasing fuel demand, for example with increased speed demand, the percentage water in the emulsion should decrease, and in fact in the said specification it is proposed that the flow of water should be maintained substantially constant.

Over a period of several years in working with this system, and in attempting to make it as effective as possible, the two inventive aspects mentioned herein have been developed and form the subject of the present invention.

As mentioned, the first aspect applies to an engine with fuel overspill or recirculation, which in fact is an engine of the type in which, when fuel is supplied to the engine, it is supplied in a quantity greater than that required for the combustion conditions. The overspill from the engine is returned to the fuel supply system via a return line.

When the engine runs on a fuel/water emulsion, the return line must be returned to a position at or before the mixing of the incoming fresh fuel and water and this return line has shown itself to be a source of difficulty in so far as pockets of air arise in the line, which eventually can lead to stalling of the engine. It should be mentioned that the said return line usually has a fall from the engine back to the fuel supply system.

In accordance with the first aspect of the invention, an internal combustion engine of the type in which there is fuel overspill, is set to be supplied with an emulsified fuel/water mixture and has a return line for the overspill connected to a point in the supply system at or before the point of mixing of incoming fresh fuel and water, and wherein there is in the return line a vent to atmosphere and preferentially a valve so that flow back to the fuel supply system is terminated in the event of the liquid level in the overspill line falling to a predetermined level, and is opened when the said level rises to a second predetermined upper level. The vent enables the escape of air and the prevention of the creation of a vacuum in the return line.

When this arrangement is used with a high overspill engine, the emulsion returned from the engine may pass directly to the emulsifier of the system or to some other point in the supply system before the emulsifier. With this system a water feed pump can be used.

Also in accordance with the first aspect of the invention there is provided a method of running an internal combustion engine wherein a fuel/water emulsion is supplied to the engine in quantity greater than that required for the powering of the engine, comprising returning the surplus emulsion through a supply line to an emulsifier to which water and fuel are supplied to be emulsified; and venting the said return line.

In the said British Patent, a water pump was used for the delivery of a constant volume of water to the emulsifier, and it was discovered that it might be possible to dispense with the pump, and in accordance with another aspect of the invention therefore the water feed pump is eliminated, and the water is arranged to flow to the supply system, for example to the emulsifier, under gravity, the water line preferably including a metering orifice in order to maintain the flow of water substantially constant or within limits, during the running of the engine. There may be a control system associated with the water supply, which may be a manually or automatically operated switch, to give control of the water supply during running of the engine, for example to cut off the water supply when the engine reaches a certain threshold such as 75% full load. The said water line may also include a solenoid valve, which acts as an on-off device to permit or prevent the flow of water through the line as related to the conditions of the engine or engine system e.g. whether it is operational or not. This aspect of the invention can be used with internal combustion engines with or without overspill.

The fuel supply line may lead from a fuel tank, through a filter and to the emulsifier, the emulsifier including an emulsification rotor which is driven automatically or is stopped again as related to the conditions of the engine or engine drive system. The said water and fuel lines may enter the emulsifier through different ports, or through the same port, in which case the water and fuel lines may meet before the water and fuel enter the emulsifier. The emulsion which is returned from the engine, when provided with an overspill arrangement as mentioned above, may enter the emulsifier directly to be mixed with the fresh incoming fuel and water, through a separate port or may be first mixed with the fresh incoming water or fuel.

The invention further provides a method of operating an internal combustion engine comprising supplying fuel and water to an emulsifier, emulsifying the fuel and water and supplying the emulsion to the engine, and wherein the water feeds to the emulsifier by gravity preferably through a flow restrictor.

In a composite system involving a high overspill diesel engine such as a Cummins engine or a marine engine, advantageous results have been obtained with the gravity feed water system indicated above and the surge tank arrangement also indicated above, being the two aspects of the present invention. The said aspects in combination provide an extremely effective system when used with an overspill type engine.

Where the invention is applied to a motor vehicle engine, it is of advantage to arrange for the return line to have a tank or reservoir into which the surplus emulsion is returned, and it is also desirable that the said tank or reservoir should be located where it can be exposed to a flow of air resulting from the motion of the vehicle so that the emulsion will be cooled prior to being returned to the emulsifier. To this end the said tank or reservoir may have external cooling fins.

Embodiments of this composite aspect of the present invention will be described, by way of example, with reference to the accompanying diagrammatic drawings, wherein:

FIG. 1 indicates in schematic form the layout of the fuel and water supply system for an automotive engine which runs on an emulsion of water and fuel;

FIG. 2 is a side view of a motor vehicle cab fitted with an engine having a supply system as shown in FIG. 1;

FIG. 3 is a plan view of the vehicle cab shown in FIG. 2;

FIGS. 4 and 5 are perspective views showing two forms of vent or surge tank which can be used in the system of FIG. 4, and FIG. 6 shows a schematic diagram of the fuel supply system to a marine engine installation.

The system shown in FIG. 1 is for a motor vehicle diesel engine with high overspill and referring to FIGS. 1 to 5 of the drawings, in FIG. 1 reference numeral 10 indicates a diesel fuel tank, from which extends a fuel line 12 to an emulsifier 14, the fuel line 12 including a filter 16.

Numeral 18 represents a water tank, and numeral 20 represents a water line extending from the tank 18 to the emulsifier 14, the said line having a solenoid valve 22 and a metering orifice 24, the latter serving to control the flow of water from the tank 18 to the emulsifier 14 to keep the flow in use as constant as possible, as will be explained hereinafter. It is to be noted that the water tank is located above the emulsifier by the height H in order that it will have sufficient head to enable the water to feed under gravity to the emulsifier 14. The emulsifier may be of any suitable construction, such as for example described in U.S. Pat. No. 4,172,668.

The water and fuel are emulsified in the emulsifier 14 and the emulsion is induced from the emulsifier by the lift pump 26 which delivers it under pressure to injectors 28 which by their own injector pumps, inject the emulsion into the cylinders of the engine in conventional manner. The excess emulsion supplied to the injectors 28 may be as high as 70%, and is returned to the emulsifier through a return line 30, said return line 30 including a vent reservoir is the form of a surge tank 32 which has an air vent 34 and a float control valve 36. The tank 32 is as will be explained, located so as to dissipate some of the heat out of the overspill fuel emulsion, but be designed and located so as to prevent cooling of the emulsion to such an extent to cause settling out of the water from the emuulsion.

Line 30 enters the surge tank 32 at the top thereof, so that the inflowing return emulsion falls freely through the upper space of the tank 32 to the bottom thereof, and the valve 36 operates to prevent flow of emulsion back to the emulsifier when the level in tank 32 reaches a predetermined lower level, and opens the outlet when the said level reaches a predetermined upper level. The vent 34 opens from the top of tank 32 and enables any air to escape to prevent the creation of air pockets in the line 30.

Reference numeral 38 represents an electrical control device for the electrical control of the various components described. The control device 38 is connected to the vehicle ignition switch and when the ignition switch is turned on, an electrical signal passes on wire 40 to open an outlet valve 41 in the water tank 18 which normally prevents flow of water through line 20, and a signal on line 42 starts up the prime mover of the emulsifier 14, which may for example be a rotor driven by an electric motor. The line 44 is for energising the solenoid valve 22, to open same, but the said line 44 does not receive the appropriate signal immediately upon switching on of the vehicle ignition, but in fact receives said signal to condition solenoid valve 22 only after the vehicle engine has fired and has been running for a predetermined period. In a specific embodiment of the invention, that period has been set at approximately 1 minute and 20 seconds. When the vehicle ignition is switched on, the engine is turned, and the engine fires, the ensuing rotation of the engine is used as a means for setting a timer, and at the end of the period set by that timer, the appropriate signal is applied on line 44. This aspect of the control is to ensure that no water is supplied to the engine from the water tank 18 during initial starting of the engine.

FIGS. 2 and 3 show the cab of the vehicle to which the system of FIG. 1 was filled. The cab is indicated by numeral 46, and the trailer portion by 48. In the plan view of FIG. 3 the engine 56 is indicated, and fuel tank 10, which is mounted to chassis number 52, is also shown. The surge tank 32 is also mounted on member 52, between the driver's cabin 54 and the trailer portion 48 so as to be located in a location where it will be contacted by air flow (indicated by numeral 56) when the vehicle is in motion. This has the effect of removing heat from the emulsion which is charged into the tank 32 before it is returned for re-emulsification.

FIGS. 4 and 5 show that the tank 32 may be a cylindrical container with axial (FIG. 4) or radial (FIG. 5) heat disipating fins.

The tank 32 could be cooled by separate cooling means to remove heat from the overspilled emmulsion.

In using a system as illustrated in FIG. 1 of the accompanying drawings, the metering orifice 24 was in fact variable and the system was set up by adjusting the size of this orifice during idling conditions over a range of water flows.

Eventually, a water flow of 20 cc per minute was found to be the optimum at idling conditions, and the orifice was fixed at this condition for the trials on the road.

Surges in water flow and hence variation in water flow were observed during running which was probably due to the fluctuation in demand reflected by the intake pressure of the injector pump 26 which draws the emulsion from emulsifier 14 and also induces flow of both water and fuel into the emulsifier and supplied the emulsions to injectors 28, but the maximum surge observed indicated a water flow of the order of 34 cc per minutte. The water flow is kept reasonably constant by the use of the orifice 24, and of course with increasing fuel demands at increased speeds, the percentage water in the emulsion reduces. As a rough guide, it is estimated that at idling conditions as much as 40% of the emulsion will be water, whereas at conditions of or near maximum speed, the percentage water in the emulsion may drop to as little as 10 to 15%.

The system described with reference to FIG. 1 operated extremely satisfactorily and gave very encouraging results, indicating fuel economies in the order of 10 to 30% when the vehicle was used in a manner simulating the normal usage of a delivery vehicle having many stops and starts during a working day.

Referring now to FIG. 6, a marine diesel engine is indicated by reference numeral 100, and the fuel supply system is shown. The diesel engine is designed to run on heavy fuel which is injected by overspill injectors 102 through injection nozzles 104. The heavy fuel system comprises a heavy fuel bulk storage tank 106, a precentrifuge tank 108, a heavy fuel service tank 110, a degassing tank 112, a supply branch 114 forming part of a busrail module 116 and a return line 118 which leads to the de-gassing tank 112. Heavy fuel is supplied through the line 114 by means of twin pumps 120, 122, a line heater 124, a viscosity controller 126 with by-pass 128, and the line and return line include changeover valves 130 and 132. When heavy fuel is being supplied to the engine, it passes along the branch 134 of the supply line 114, through changeover valve 130, branch 136, to the injector pumps 102, and the overspill returns through branch 138, a purge cock 140, changeover valve 132 and then line 118.

The tanks 106 and 110 are provided with outflow heaters as shown.

The system is adapted to be supplied with water from a water tank 142 through a feed line 144, to an emulsifier 146 in the line 114, in this case before the pumps 120 and 122. By this arrangement, the water can be fed from the tank 142 under gravity through a suitable flow restrictor as described herein in order to control the rate of water supply, the water tank 142 being located at a suitable height above the emulsifier for this purpose. Emulsification and the supply of the emulsion to the engine is as already described herein, with the beneficial results as described. The de-gassing tank 112 forms the vent brake in the return line which results in the desirable features of the invention as already described.

Instead of the emulsifier and water supply line being positioned at the location shown, it could be located after the pumps 120 and 122 or at another point in the line 114, but if the water is introduced at a location where there is an above atmospheric line pressure, then the pump may be required for pumping the water into the line 114.

The marine engine shown has a distillate fuel supply system comprising a distillate fuel service tank 150, a distillate fuel supply 152, with by-pass 154, and a filter 156. The return distillate fuel from the injector pumps 102 is via by the purge cock 140 and changeover valve 132, appropriately positioned, and the return line 158. Finally, the engine also has injector cooling indicated by the lines 160 and 162 through which the cooling liquid, which may be water or the distillate fuel is circulated by means of the pump 162, and there is a heater 164 for maintaining the viscosity of the injector cooling fluid.

By manipulation of the changeover valves 130, 132 and the purge cock, the engine is made to start up on lighter distillate fuel, and when running, the changeover valves are altered for the supply of the heavy fuel, or in this case the heavy fuel/water emulsion. When the engine is to be shut down, the heavy fuel is purged from the system by distillate fuel by appropriate positioning of the purge cock 140. The purged fuel return line is indicated by numeral 166.

The vent for the de-gassing tank 112 is indicated by numeral 168, and it will be seen that the vent 168 is common to both the de-gassing tank 112 and the heavy fuel service tank 110.

We claim:

1. An internal combustion engine which is set to be run on an emulsion of fuel and water including a water supply line, a fuel supply line, an emulsifier for forming an emulsion of fuel and water supplied from the said lines, the engine having a return line for returning overspill emulsion to be returned to the emulsifier, characterized in that in the return line there is a surge tank having a vent to atmosphere.

2. An engine according to claim 1 including a valve in the surge tank so that overspill flow from the tank back to the fuel emulsifier is terminated in the event of the liquid level in the tank falling to a predetermined level, and is opened when the said level rises to a second predetermined upper level.

3. An engine according to claim 1 wherein the emulsion from the surge tank passes directly to the emulsifier.

4. An internal combustion engine according to claim 1 further characterized in that there is a water tank located so as to cause gravity feed of the water to the location where it meets the fuel.

5. An engine according to claim 4 wherein the water line includes a metering orifice in order to maintain the flow of water substantially constant or within limits.

6. An engine according to claim 4 wherein the water line also includes a solenoid valve, which acts as an on-off device to permit or prevent the flow of water through the line depending upon whether or not the vehicle ignition is switched on or switched off.

7. An engine according to claim 1 wherein the emulsifier includes an emulsification rotor which is driven automatically when the vehicle engine ignition is switched on and stops when the ignition is switched off.

* * * * *